(12) United States Patent
Ferrara et al.

(10) Patent No.: US 10,701,099 B2
(45) Date of Patent: Jun. 30, 2020

(54) PROVIDING EFFICIENT INFORMATION TRACKING WITH DYNAMICALLY SELECTED PRECISION

(71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US); Petar I. Tsankov, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/278,517

(22) Filed: Sep. 28, 2016

(65) Prior Publication Data

US 2018/0091541 A1  Mar. 29, 2018

(51) Int. Cl.
*H04L 29/06* (2006.01)
*H04W 12/02* (2009.01)

(52) U.S. Cl.
CPC .......... *H04L 63/1433* (2013.01); *H04L 63/04* (2013.01); *H04L 63/1425* (2013.01); *H04W 12/02* (2013.01)

(58) Field of Classification Search
CPC .................................................. H04L 63/1433
See application file for complete search history.

(56) References Cited

U.S. PATENT DOCUMENTS 8,566,947 B1 * 10/2013 Sankruthi ............... G06F 21/55
726/22
9,158,604 B1 * 10/2015 Christodorescu ......... G06F 9/54

2009/0193492 A1 * 7/2009 Banerjee ............. G06F 21/6218
726/1
2011/0030061 A1 * 2/2011 Artzi ................... G06F 11/3604
726/25
2012/0023486 A1 * 1/2012 Haviv ................... G06F 21/577
717/126

(Continued)

FOREIGN PATENT DOCUMENTS

JP  2010-141655  *  1/2010

OTHER PUBLICATIONS

Identifying and Tracking Switching, Non-Stationary Opponents—A Bayesian Approach (Hernandez Leal Feb. 2013) (Year: 2013).*
NPL Search (Google Scholar) (Year: 2020).*

*Primary Examiner* — Mahfuzur Rahman
*Assistant Examiner* — Richard W Cruz-Franqui
(74) *Attorney, Agent, or Firm* — Scully, Scott, Murphy & Presser, P.C.; Daniel Morris, Esq.

(57) ABSTRACT

An improved information tracking procedure is provided. A precise information tracking procedure is performed for a sensitive value when an application is predicted to modify the sensitive value prior to the sensitive value reaching a data sink. The sensitive value comprises an attribute that may be linked to external knowledge to reveal sensitive information about an individual. In response to the application not being predicted to modify the sensitive value prior to the sensitive value reaching the data sink, a value-based information tracking procedure is performed. The value-based information tracking procedure comprises storing one or more values that are observed at a data source, and then determining whether or not each of these one or more values are observed at the data sink.

12 Claims, 3 Drawing Sheets

(56) References Cited

U.S. PATENT DOCUMENTS

| | | | |
|---|---|---|---|
| 2012/0192161 A1* | 7/2012 | Pistoia | G06F 8/75 717/131 |
| 2012/0210388 A1* | 8/2012 | Kolishchak | G06F 21/552 726/1 |
| 2012/0210432 A1* | 8/2012 | Pistoia | G06F 11/3604 726/25 |
| 2013/0152204 A1* | 6/2013 | Pistoia | G06F 11/3684 726/25 |
| 2014/0130154 A1* | 5/2014 | Dolby | G06F 21/577 726/22 |
| 2014/0157420 A1* | 6/2014 | Guarnieri | G06F 21/562 726/25 |
| 2014/0173743 A1* | 6/2014 | Gluck | G06F 21/54 726/25 |
| 2014/0237545 A1* | 8/2014 | Mylavarapu | H04L 63/1441 726/3 |
| 2014/0237604 A1* | 8/2014 | Guarnieri | G06F 21/577 726/25 |
| 2015/0082430 A1* | 3/2015 | Sridhara | G06F 21/566 726/23 |
| 2015/0161393 A1* | 6/2015 | Pistoia | G06F 21/577 726/25 |
| 2015/0227746 A1* | 8/2015 | Chen | G06F 21/577 726/25 |
| 2015/0242635 A1* | 8/2015 | Li | G06F 21/577 726/25 |
| 2015/0271198 A1* | 9/2015 | Hay | H04L 63/1433 726/25 |
| 2016/0105396 A1* | 4/2016 | Hastings | H04L 63/0245 726/11 |
| 2016/0217029 A1* | 7/2016 | Yoon | G06F 11/3612 |
| 2017/0048698 A1* | 2/2017 | Choffnes | H04L 43/045 |
| 2018/0013783 A1* | 1/2018 | Anachi | H04L 63/1433 |
| 2018/0124097 A1* | 5/2018 | Tiwari | H04L 63/1425 |
| 2018/0131719 A1* | 5/2018 | Amit | H04L 63/20 |

* cited by examiner

US 10,701,099 B2

PROVIDING EFFICIENT INFORMATION TRACKING WITH DYNAMICALLY SELECTED PRECISION

FIELD

The present application relates generally to software applications and, more particularly, to techniques for detecting security vulnerabilities in mobile or web-based applications.

BACKGROUND

While dynamic systems for detecting security vulnerabilities in mobile or web applications often report low runtime overhead, the dynamic systems for fixing security vulnerabilities typically incur more significant overhead. This difference in overhead exists because a computing system needs to track a considerable amount of contextual data in order to correctly repair a security vulnerability. For example, to correctly fix privacy vulnerabilities in mobile applications using a precise information tracking approach, the computing system must keep track of primitive values, and the system must also implement a computationally expensive, source-sensitive, character-level taint analysis procedure. Taint analysis is a form of information flow analysis. Information flows from object x to object y whenever information stored in object x is transferred to object y. If the source of the value of the object x is untrustworthy, then object x is regarded as tainted. The additional overhead required to keep track of primitive values and perform taint analysis typically represents an increase of several times to several hundred times, rendering such dynamic approaches infeasible to put into practice.

An alternative approach to information tracking, which is more efficient but less precise, is value-based information tracking. In value-based information tracking, the computing system remembers the values that are observed at a data source, and then checks to ascertain whether these values are observed at a data sink. The data sink is an object that can be bound to external data made available by the data source. One limitation of the value-based tracking approach is that if an application modifies a sensitive value, then the computing system may miss a security vulnerability. Thus, there exists a need to overcome at least one of the preceding deficiencies and limitations of the related art.

SUMMARY

The following summary is merely intended to be exemplary. The summary is not intended to limit the scope of the claims.

A method for providing an improved information tracking procedure, in one aspect, comprises performing a precise information tracking procedure for a sensitive value when an application is predicted to modify the sensitive value prior to the sensitive value reaching a data sink. The sensitive value comprises an attribute that may be linked to external knowledge to reveal sensitive information about an individual. The precise information tracking procedure comprises tracking one or more primitive values, and implementing a source-sensitive, character-level taint analysis procedure. In response to the application not being predicted to modify the sensitive value prior to the sensitive value reaching the data sink, a value-based information tracking procedure is performed. The value-based information tracking procedure comprises storing one or more values that are observed at a data source, and then determining whether or not each of these one or more values are observed at a data sink by monitoring the data sink.

A computer program product for providing an improved information tracking procedure, in another aspect, comprises a non-transitory computer-readable storage medium having a computer-readable program stored therein, wherein the computer-readable program, when executed on a computer system comprising at least one processor, causes the computer system to perform a precise information tracking procedure for a sensitive value when an application is predicted to modify the sensitive value prior to the sensitive value reaching a data sink. The sensitive value comprises an attribute that may be linked to external knowledge to reveal sensitive information about an individual. The precise information tracking procedure comprises tracking one or more primitive values, and implementing a source-sensitive, character-level taint analysis procedure. In response to the application not being predicted to modify the sensitive value prior to the sensitive value reaching the data sink, a value-based information tracking procedure is performed. The value-based information tracking procedure comprises storing one or more values that are observed at a data source, and then determining whether or not each of these one or more values are observed at a data sink by monitoring the data sink.

An apparatus for providing an improved information tracking procedure, in another aspect, may comprise a processor and a non-transitory computer-readable memory coupled to the processor, wherein the memory comprises instructions which, when executed by the processor, cause the processor to perform a precise information tracking procedure for a sensitive value when an application is predicted to modify the sensitive value prior to the sensitive value reaching a data sink. The sensitive value comprises an attribute that may be linked to external knowledge to reveal sensitive information about an individual. The precise information tracking procedure comprises tracking one or more primitive values, and implementing a source-sensitive, character-level taint analysis procedure. In response to the application not being predicted to modify the sensitive value prior to the sensitive value reaching the data sink, a value-based information tracking procedure is performed. The value-based information tracking procedure comprises storing one or more values that are observed at a data source, and then determining whether or not each of these one or more values are observed at a data sink by monitoring the data sink.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

An improved information tracking procedure performs a precise information tracking procedure for a sensitive value when an application is predicted to modify the sensitive value prior to the sensitive value reaching a data sink. The precise information tracking procedure comprises tracking one or more primitive values, and implementing a source-sensitive, character-level taint analysis procedure. In response to the application not being predicted to modify the sensitive value prior to the sensitive value reaching the data sink, a value-based information tracking procedure is performed. The value-based information tracking procedure comprises storing one or more values that are observed at a data source, and then determining whether or not each of these one or more values are observed at a data sink by monitoring the data sink.

Figure 1:
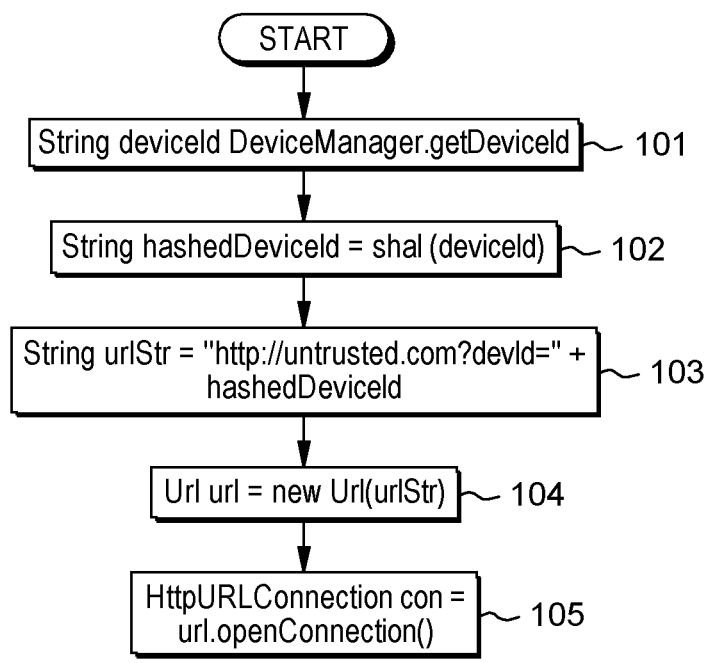
FIG. 1 is a flowchart illustrating an example of a mobile application that exposes the location of a mobile device to an unauthorized server.

Refer to FIG. 1 which is an illustrative example of a mobile application that exposes the location of a mobile device to an unauthorized server. The mobile application commences at block 101 where the application executes a first instruction: deviceId=DeviceManager.getDeviceId( ). The first instruction obtains a unique device identifier for the mobile device. Next, at block 102, the mobile application executes a second instruction: String hashedDeviceId=sha1 (deviceId). At block 103, the mobile application executes a third instruction: String urlStr=http://untrusted.com-?devId=+hashedDeviceId. The second and third instructions are used to hash the device identifier. Then, at block 104, the mobile application executes a fourth instruction: Url url=new Url(urlStr). The fourth instruction constructs a new Uniform Resource Locator (URL) object. The operational sequence of FIG. 1 continues to block 105 where the mobile application executes a fifth instruction: HttpURLConnection con=url.openConnection( ). The fifth instruction uses the constructed URL object of block 104 to open a connection to an untrusted server denoted as untrusted.com.

In order to detect that the object url at block 105 contains private information (namely, the hashed device identifier) the precise information tracking procedure would be performed by tainting the deviceId object at block 101 using a taint tag, and then propagating the taint tag to the object url. One can, however, switch to the more efficient value-based information tracking procedure without degrading the precision of the information tracking process because a tainted value for the hashedDeviceId object is not transformed past block 102.

An analysis was conducted to determine whether or not it is acceptable to switch from the precise information tracking procedure to the value-based information tracking procedure without sacrificing precision. The results of the analysis indicate that there are numerous instances in which the application does not modify a sensitive value along a trace. In these instances, one can therefore often switch to value-based information tracking without degrading precision.

Figure 2:
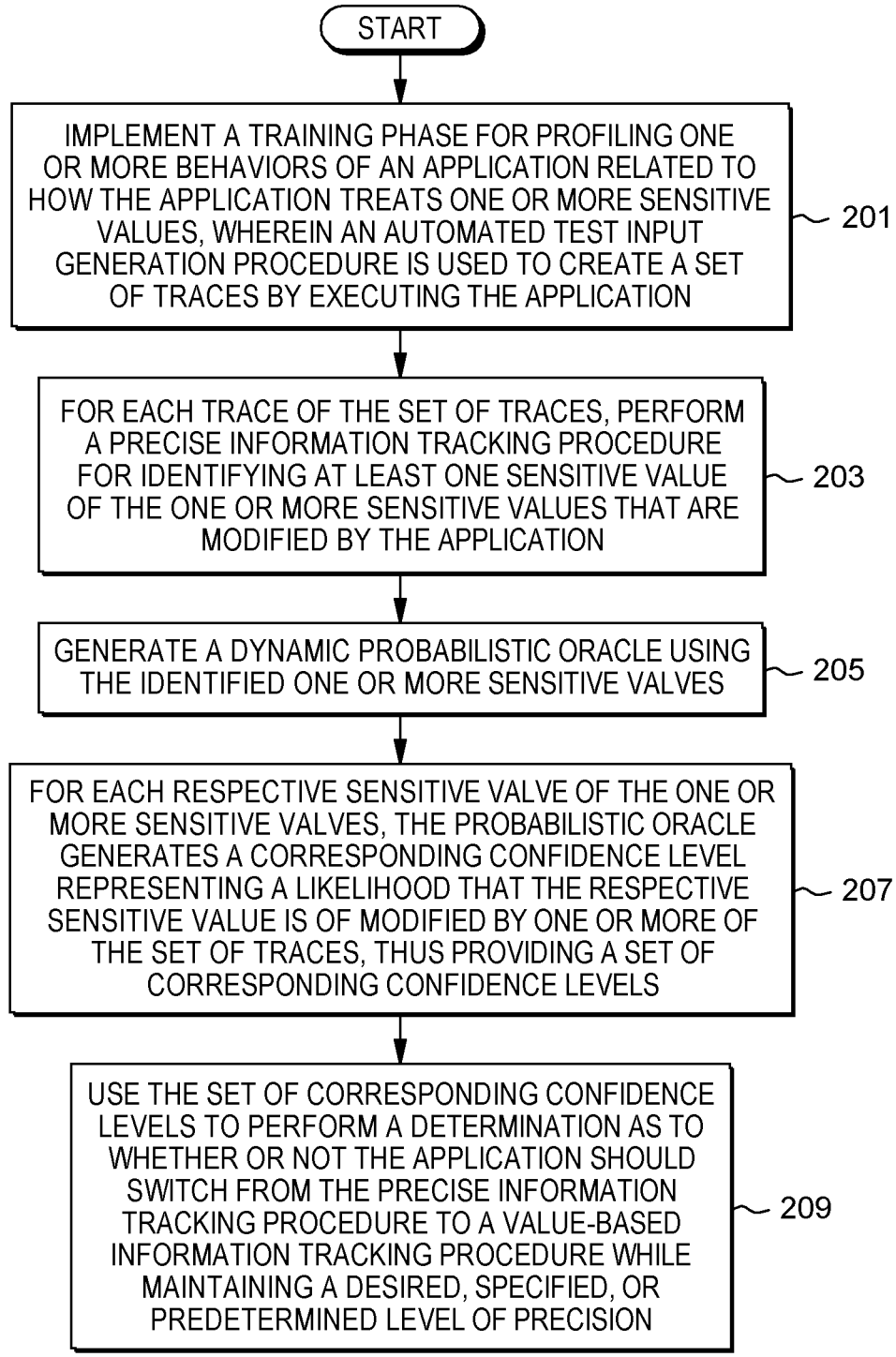
FIG. 2 is a flowchart illustrating an exemplary method for performing information tracking.

FIG. 2 is a flowchart illustrating an exemplary method for performing information tracking. In overview, the method collects a set of traces to profile a behavior for an application. The profiled behavior is used to construct a dynamic probabilistic oracle. The dynamic probabilistic oracle is used to provide a switching signal for selectively switching from a precise information tracking procedure to a value-based information tracking procedure.

The procedure of FIG. 2 commences at block 201 where a training phase is implemented for profiling one or more behaviors of an application. An automated test input generation procedure is used to create a set of traces by executing the application, wherein the set of traces includes one or more sensitive values. Each sensitive value of the one or more sensitive values comprises an attribute that may be linked to external knowledge to reveal sensitive information about an individual. Next, at block 203, for each trace of the set of traces, the application runs a precise information tracking procedure and identifies at least one sensitive value of the one or more sensitive values that are modified by the application. The precise information tracking procedure comprises tracking one or more primitive values, and implementing a source-sensitive, character-level taint analysis procedure.

The operational sequence of FIG. 2 progresses to block 205 where a dynamic probabilistic oracle is generated using the identified one or more sensitive values. Then, at block 207, for each respective sensitive value of the one or more sensitive values, the probabilistic oracle generates a corresponding confidence level representing a likelihood that the respective sensitive value is modified by one or more traces of the set of traces, thus providing a set of corresponding confidence levels. Next, at block 209, the set of corresponding confidence levels is used to perform a determination as to whether or not the application should switch from the precise information tracking procedure to a value-based information tracking procedure while maintaining a desired, specified, or predetermined level of precision. The value-based information tracking procedure comprises storing one or more values that are observed at a data source, and then determining whether or not each of these one or more values are observed at a data sink by monitoring the data sink. This determination is performed such that, in response to a confidence level of the set of corresponding confidence levels indicating that a sensitive value of the one or more sensitive values is not likely to be modified by one or more traces of the set of traces, the value-based information tracking procedure is performed, and otherwise, the precise information tracking procedure is performed. When the value-based information tracking procedure is performed, any taint tags associated with the sensitive value of the one or more sensitive values is removed. This removal effectively passes the responsibility for fixing any vulnerabilities related to the sensitive value to the value-based information tracking procedure. In general, the procedure of FIG. 2 may be generalized to a procedure or a system that switches between multiple processes or multiple systems for information to provide different levels of precision guarantees and runtime overhead.

Figure 3:
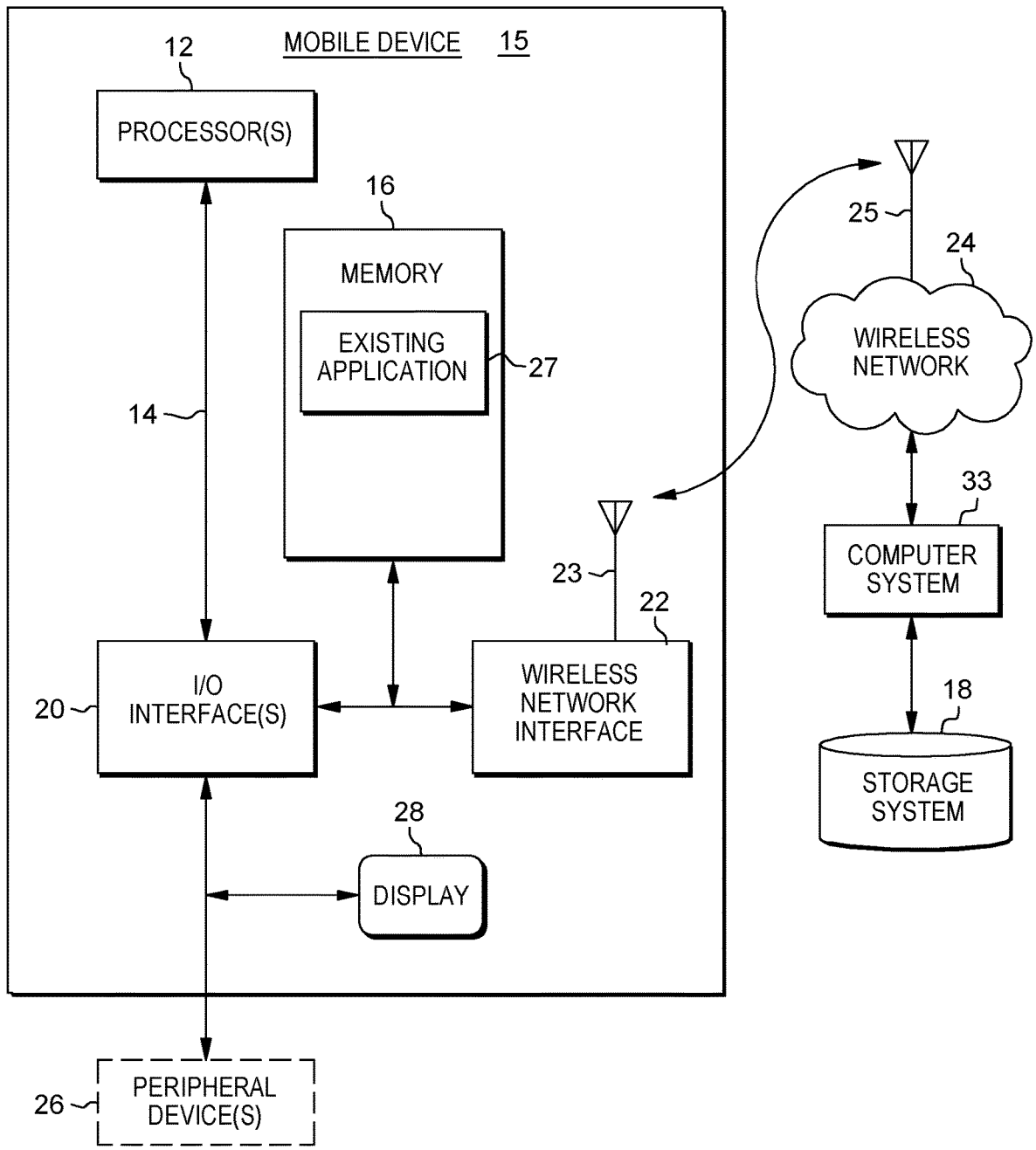
FIG. 3 is a hardware block diagram of an exemplary computer or processing system that may implement any of the methods of FIGS. 1 and 2, in one set of embodiments of the present disclosure.

FIG. 3 illustrates a schematic of an exemplary processing system that may implement any of the methods of FIGS. 1-2, in one set of embodiments of the present disclosure. The processing system is only one example of a suitable processing system and is not intended to suggest any limitation as to the scope of use or functionality of embodiments of the methodology described herein. In the example of FIG. 3, the processing system includes a mobile device 15 and a computer system 33. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The mobile device 15 is a portable computing device. Some illustrative examples of the mobile device 15 include a smartphone, a tablet computer, a cellphone, a personal digital assistant (PDA), a portable communications device, or a navigation system. The mobile device 15 is only one example of a suitable processing system and is not intended to suggest any limitation as to the scope of use or functionality of embodiments of the methodology described herein.

The mobile device 15 includes one or more processors 12 operatively coupled to a computer-readable memory 16. The memory 16 can include computer system readable media in the form of volatile memory, or non-volatile memory, or any of various combinations thereof. Some illustrative examples of volatile memory include random access memory (RAM) and/or cache memory, or other types of memory devices, or any of various combinations thereof. Some illustrative examples of non-volatile memory include read-only memory (ROM), magnetic media such as a "hard drive", a solid-state storage drive, or an optical disk drive. The memory 16 includes an operating system (OS) that is executed by the one or more processors 12. Illustrative examples of operating systems include Andriod™ and Apple iOS™. The one or more processors 12 are configured to execute various types of software applications, sometimes referred to as apps.

The one or more processors 12 may be described in the general context of computer system executable instructions, such as program modules, being executed by a computer system. Generally, program modules may include routines, programs, objects, components, logic, data structures, and so on that perform particular tasks or implement particular abstract data types. Thus, the one or more processors 12 may include a module that performs the methods described herein with reference to FIGS. 1 and 2. The module may be programmed into the integrated circuits of the one or more processors 12, or loaded from the memory 16, or the wireless network 24, or any of various combinations thereof.

The mobile device 15 may be operational with numerous other general purpose or special purpose computing system environments or configurations. Thus, the mobile device 15 includes a wireless network interface 22 coupled to a first antenna 23. The wireless network interface 22 and the first antenna 23 are configured for communicating with a wireless network 24 that is coupled to a second antenna 25. The wireless network 24 is operatively coupled to the computer system 33.

Illustratively, the wireless network interface 22 is configured for implementing wireless communication using a wireless standard such as Global System for Mobile Communications (GSM), Universal Mobile Telecommunications System (UMTS), Code Division Multiple Access (CDMA), Long-Term Evolution (LTE), 2G, 3G, 4G, 5G, Near Field Communications (NFC), WiFi, WiMAX, or Bluetooth. In general, these wireless standards are configured for efficiently dividing the finite RF spectrum among multiple users. For example, GSM uses time-division multiple access (TDMA) and frequency-division multiple access (FDMA) to provide separation among users and cells. UMTS and CDMA-2000 use code-division multiple access (CDMA). WiMAX and LTE use orthogonal frequency division multiplexing (OFDM), Illustratively, the mobile device 15 uses one or more of the foregoing wireless standards to access the Internet through the wireless network 24.

TDMA provides mobile device 15 access to the wireless network 24 by chopping up a physical RF communications channel occupying a given frequency bandwidth into sequential time slices. Each user of the channel takes tunas to transmit and receive signals. In reality, only one mobile device 15 is actually using the channel at any specific moment in time. This is analogous to time-sharing on a large computer server. FDMA provides multiuser access by separating the frequencies used by each of a plurality of mobile devices such as the mobile device 15. In GSM, the FDMA approach is used to separate each of a plurality of cells of the wireless network 24, and then TDMA is used to separate each of a plurality of mobile device 15 users within the cell.

CDMA uses spread-spectrum digital modulation to spread voice data over a very wide channel pseudorandom fashion using a mobile device 15-specific or cell-specific pseudorandom code. A receiver at the wireless network 24 undoes the randomization to collect the bits together and produce the original voice data. As the codes are pseudorandom and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation mobile device 15 users. The users are multiplexed in the frequency domain by allocating specific sub-bands to individual users. This is often enhanced by also performing TDMA and changing the allocation periodically so that different users are assigned different sub-bands at different times. The foregoing wireless standards are provided solely for purposes of illustration, as the mobile device 15 may be configured for communicating with the wireless network 24 using any communications standard.

The mobile device 15 includes an input/output (I/O) interface 20. The I/O interface is used to interface the one or more processors 12 to the wireless network interface 22, a display 28, and one or more optional peripheral devices 26 such as a keyboard, a pointing device, or one or more devices that enable a user to interact with the mobile device 15. The display 28 may be provided in the form of a touch-sensitive screen and/or a miniature keyboard. The touch-sensitive screen may be configured to accept a tactile input or a stylus input, or both. The optional peripheral devices 26 may also include any device, such as a network card or a modem, that enables the mobile device 15 to communicate with one or more other computing devices. Such communication can occur via the I/O interface 20.

The computer system 33 may include a variety of computer system readable media. Such media may be any available media that is accessible by computer system, and it may include both volatile and non-volatile media, removable and non-removable media. In the example of FIG. 3, the computer system 33 is configured for accessing a storage system 18 on which at least one new application 29 is stored. The computer system 33 may be described in the general context of computer system executable instructions, such as program modules, being executed by a computer system. Generally, program modules may include routines, programs, objects, components, logic, data structures, and so on that perform particular tasks or implement particular abstract data types. Examples of well-known computing systems, environments, and/or configurations that may be suitable for implementing the computer system 33 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 33 may be practiced in distributed cloud computing environments where tasks are performed by remote processing devices that are linked through a communications network such as the wireless network 24. In a distributed cloud computing environment, program modules may be located in both local and remote computer system storage media including memory storage devices such as the storage system 18.

The computer system 33 may further include other removable/non-removable, volatile/non-volatile computer system storage media. By way of example only, the storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

Both the mobile device 15 and the computer system 33 can communicate with one or more networks, such as the wireless network 24, a local area network (LAN), a general wide area network (WAN), and/or a public network (e.g., the Internet). It should be understood that although not shown, other hardware and/or software components could be used in conjunction with the computer system 33. Examples include, but are not limited to: microcode, device drivers, redundant processing units, external disk drive arrays, RAID systems, tape drives, and data archival storage systems, etc.

The mobile device 15 may be equipped with a source of battery power. Optionally, the mobile device 15 may also be equipped with a Global Positioning System (GPS) receiver for utilizing one or more location-based services. Other optional features of the mobile device 15 may include a camera, a media player for playing hack video or music files, or one or more sensors. Such sensors may include an accelerometer, a compass, a magnetometer, or a gyroscope, allowing detection of orientation of motion. Optionally, the mobile device 15 may provide biometric user authentication, such as using a built-in camera for facial recognition or using a fingerprint sensor for fingerprint recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing an improved information tracking procedure on a mobile device, the method comprising:

identifying, by a hardware processor, based on a profile behavior profile of an application running on the mobile device, one or more sensitive values determined to be modified by the application;

obtaining, by a hardware processor on the mobile device, for each said identified one or more sensitive values, a corresponding prediction indicating the application will modify a sensitive value prior to the sensitive value reaching a data sink, said hardware processor generating a probabilistic oracle to predict whether or not the sensitive value will be modified prior to the sensitive value reaching the data sink, said probabilistic oracle determining a corresponding confidence level for each of a respective plurality of sensitive values including the sensitive value to generate a set of corresponding confidence levels indicating a likelihood that a sensitive value of the plurality of sensitive values will be modified by the application;

performing, by the hardware processor, a precise character-level taint analysis-based information tracking procedure for a sensitive value when an application is predicted to modify the sensitive value prior to the sensitive value reaching a data sink, wherein the precise character-level taint analysis-based information tracking procedure comprises:

tracking one or more primitive values, and implementing a source-sensitive, character-level taint analysis procedure;

generating, by the hardware processor, a switching signal based on a prediction indicating the application will not modify a sensitive value prior to the sensitive value reaching the data sink; and in response to the generated switching signal, performing, by the hardware processor, a value-based information tracking procedure for said sensitive value while maintaining a desired predetermined level of precision of the information tracking procedure.

2. The method of claim 1 wherein the sensitive value comprises an attribute that is linked to external knowledge to reveal sensitive information about an individual.

3. The method of claim 1 wherein the value-based information tracking procedure comprises storing one or more observed values that are observed at a data source, and then determining whether or not each of the one or more observed values are observed at the data sink by monitoring the data sink.

4. The method of claim 1, wherein said source-sensitive, character-level taint analysis procedure implements a taint tag associated with the sensitive value of the one or more identified sensitive values, said method further comprising:

removing said taint tag associated with the sensitive value of the one or more sensitive values when executing said value-based information tracking procedure.

5. An apparatus for performing an improved information tracking procedure on a mobile device, the apparatus comprising a processor and a non-transitory computer-readable memory coupled to the processor, wherein the memory comprises instructions which, when executed by the processor, cause the processor to perform:

identify, based on a profile behavior profile of an application running on the mobile device, one or more sensitive values determined to be modified by the application;

obtain, for each said identified one or more sensitive values, a corresponding prediction indicating the application will modify a sensitive value prior to the sensitive value reaching a data sink by generating a probabilistic oracle to predict whether or not the sensitive value will be modified prior to the sensitive value reaching the data sink, said probabilistic oracle determining a corresponding confidence level for each of a respective plurality of sensitive values including the sensitive value to generate a set of corresponding confidence levels indicating a likelihood that a sensitive value of the plurality of sensitive values will be modified by the application;

executing a precise character-level taint analysis-based information tracking procedure for a sensitive value when an application is predicted to modify the sensitive value prior to the sensitive value reaching a data sink, wherein the precise character-level taint analysis-based information tracking procedure comprises:

tracking one or more primitive values, and implementing a source-sensitive, character-level taint analysis procedure;

generate a switching signal based on a prediction indicating the application will not modify a sensitive value prior to the sensitive value reaching the data sink; and in response to the generated switching signal, executing a value-based information tracking procedure for said sensitive value while maintaining a desired predetermined level of precision of the information tracking procedure.

6. The apparatus of claim 5 wherein the sensitive value comprises an attribute that is linked to external knowledge to reveal sensitive information about an individual.

7. The apparatus of claim 5 wherein the value-based information tracking procedure comprises storing one or more observed values that are observed at a data source, and then determining whether or not each of the one or more observed values are observed at the data sink by monitoring the data sink.

8. The apparatus of claim 5, wherein said source-sensitive, character-level taint analysis procedure implements a taint tag associated with the sensitive value of the one or more identified sensitive values, said method further comprising:

removing said taint tag associated with the sensitive value of the one or more sensitive values when executing said value-based information tracking procedure.

9. A computer program product for performing an improved information tracking procedure on a mobile device, the computer program product comprising a non-transitory computer-readable storage medium having a computer-readable program stored therein, wherein the computer-readable program, when executed on a computer system comprising at least one processor, causes the processor to perform:

identifying, based on a profile behavior profile of an application running on the mobile device, one or more sensitive values determined to be modified by the application;

obtaining, for each said identified one or more sensitive values, a corresponding prediction indicating the application will modify a sensitive value prior to the sensitive value reaching a data sink by generating a probabilistic oracle to predict whether or not the sensitive value will be modified prior to the sensitive value reaching the data sink, said probabilistic oracle determining a corresponding confidence level for each of a respective plurality of sensitive values including the sensitive value to generate a set of corresponding confidence levels indicating a likelihood that a sensitive value of the plurality of sensitive values will be modified by the application;

executing a precise character-level taint analysis-based information tracking procedure for a sensitive value when an application is predicted to modify the sensitive value prior to the sensitive value reaching a data sink, wherein the precise character-level taint analysis-based information tracking procedure comprises:

tracking one or more primitive values, and implementing a source-sensitive, character-level taint analysis procedure;

generating a switching signal based on a prediction indicating the application will not modify a sensitive value prior to the sensitive value reaching the data sink; and in response to the generated switching signal, executing a value-based information tracking procedure while maintaining a desired predetermined level of precision of the information tracking procedure.

10. The computer program product of claim 9 wherein the sensitive value comprises an attribute that is linked to external knowledge to reveal sensitive information about an individual.

11. The computer program product of claim 9 wherein the value-based information tracking procedure comprises storing one or more observed values that are observed at a data source, and then determining whether or not each of the one or more observed values are observed at the data sink by monitoring the data sink.

12. The computer program product of claim 9, wherein said source-sensitive, character-level taint analysis procedure implements a taint tag associated with the sensitive value of the one or more identified sensitive values, said method further comprising:

removing said taint tag associated with the sensitive value of the one or more sensitive values when executing said value-based information tracking procedure.

* * * * *